United States Patent [19]

Kim

[11] 4,415,169
[45] Nov. 15, 1983

[54] SEAL FOR CONCENTRIC TUBULAR MEMBER

[75] Inventor: Yung J. Kim, Hacienda Heights, Calif.

[73] Assignee: Baker International Corporation, Orange, Calif.

[21] Appl. No.: 306,458

[22] Filed: Sep. 28, 1981

[51] Int. Cl.³ .................. F16L 15/02; F16L 55/00
[52] U.S. Cl. .................................................. 277/125
[58] Field of Search .............. 277/1, 117, 125, 123, 277/124

[56] References Cited

U.S. PATENT DOCUMENTS

| | | | |
|---|---|---|---|
| 3,319,647 | 5/1967 | Morain | 277/59 |
| 3,351,350 | 11/1967 | Sherlel | 277/58 |
| 3,433,506 | 3/1969 | Crowe | 277/26 |
| 3,467,394 | 9/1969 | Bryant | 277/1 |

*Primary Examiner*—Robert I. Smith

*Attorney, Agent, or Firm*—Norvell & Associates

[57] ABSTRACT

A seal assembly employing a thermoplastic sealing element, such as polytetrafluoroethylene, for maintaining sealing integrity between inner and outer concentric tubular members is disclosed. Axial extrusion of the sealing element through a constricted passage into a cavity adjacent the surface of one of the tubular members is allowed when the sealing element expands due to increased heat or pressure. Axial contraction through this same passage serves to maintain sealing integrity in the vicinity of this passage. The performance of the contracting sealant is improved during a cooling cycle by utilizing a cylindrical seal ring member having a thermal expansion coefficient less than that of the outer tubular member so that the constricted passage formed between the seal ring and the outer tubular member narrows during cooling. This seal assembly is adapted for use in an expansion joint employed in an oil or gas subterranean well.

32 Claims, 6 Drawing Figures

SEAL FOR CONCENTRIC TUBULAR MEMBER

BACKGROUND OF THE INVENTION

1. Field Of The Invention:

This invention relates to a sealing system for use between relatively movable surfaces, such as concentric tubular members, under varying temperatures and pressures such as may be encountered in completion and production operations in oil and gas wells.

2. Description Of The Prior Art:

Establishing a seal between adjacent surfaces, such as concentric tubular members, under varying temperature, pressure and environmental conditions can be quite difficult. Seals formed of materials having substantially total elastic memory are generally desirable for use as sealing elements. However, materials which exhibit perfect elastomeric behavior under certain conditions generally do not retain these characteristics over a wide range of temperature and pressure. These materials may also be especially susceptible to attack by highly corrosive materials, such as hydrogen sulfide. Other materials, which may be too plastically deformable to be characterized as elastomeric in the strict sense of that term, may nevertheless have better sealing characteristics under hostile conditions. For example, the thermoplastic, polytetrafluoroethylene, commonly referred to as "Teflon", a trademark of DuPont, can be useful as a sealing material and also has good resistance to corrosive materials. Teflon has, however, a relatively low resiliency and high permanent set.

Polytetrafluoroethylene members have been used as sealing or packing elements in both subterranean oil well applications and to establish sealing engagement with cylindrical members in other applications. For example, Teflon packing elements have been utilized for external packer-to-casing packing element systems where the packing element is subjected to compressive preloading which energizes the element and forces it radially outward to establish sealing engagement with the casing. Teflon elements have also been employed in chevron-shaped self-energizing sealing elements. U.S. Pat. No. 3,351,350 depicts a high pressure rod seal employing a preloaded polytetrafluoroethylene ring used independently of a separate chevron ring made from neoprene impregnated duck fabric.

The prior art use of polytetrafluoroethylene in a chevron-shaped configuration illustrates the need for means to prevent axial extrusion of Teflon members and to enhance the elastic memory of Teflon elements. The use of a plurality of chevron-shaped glass-filled Teflon members in combination with a two-piece titanium metal-to-metal anti-extrusion ring was reported in Report No. SPE 6762 of the 52nd Annual Fall Technical Conference and Exhibition of the Society of Petroleum Engineers on October 9th through the 12th, 1977. Satisfactory performance of the chevron-shaped Teflon members was achieved only in conjunction with the two-piece metal-to-metal anti-extrusion ring.

The alternative problem of imparting elastic memory to the Teflon member is examined in U.S. Pat. No. 3,467,394. That patent discloses a packing assembly employing Vee-shaped polytetrafluoroethylene sealing elements interspersed with relatively rigid packing rings. The packing rings are made from flexible materials, including various flexible types of elastomers and plastics which are used to impart their memory to the Teflon sealing rings. A packing ring comprising alternating rings of thermosetting material and thermoplastic material, such as Teflon, is disclosed in U.S. Pat. No. 3,627,337. The more or less rigid non-flowing thermosetting materials were found to restrain the thermoplastic components against excessive flow.

The behavior of thermoplastic sealing elements, such as Teflon, has also led to designs in which the configuration of the tubular members in an expansion joint has been altered to improve Teflon seal performance. In U.S. Pat. No. 3,433,506, the Teflon was permitted to expand into spaced grooves on one member so that longitudinal contraction of the Teflon would promote sealing along the edges of the grooves.

The present invention also utilizes a unique geometry which, in conjunction with the thermal expansion characteristics of thermoplastic materials such as Teflon, resulting in a seal having improved performance. This seal system can be employed to establish a seal along a sealing surface of conventional tubular members such as those used in an expansion joint in a conduit or tubing string in an oil and gas well. However, this seal system can be employed in other applications.

SUMMARY OF THE INVENTION

A seal assembly for establishing sealing integrity between an inner tubular member and a concentric outer tubular member comprises a cylindrical sealing elements, an intermediate cylindrical seal ring, and a cylindrical back-up member. Axial extrusion through a constricted passage formed by a raised surface on the seal ring and the cooperating tubular member and into a cavity is allowed. The back-up member prevents axial extrusion past this outer member, however. The constricted passage serves to restrict axial contraction of the sealing element from the cavity back through the constricted passage with sealing integrity being maintained at the constricted passage.

This seal assembly improves the performance of a thermoplastic sealing element such as polytetrafluoroethylene during the cooling cycle after axial extrusion of the sealing element during a heating cycle. When cooled, the sealing element recedes from the inner surface of the outer tubular member, but axial contraction through the constricted passage maintains sealing integrity at the constricted passage. Preferably, the seal ring is formed of a material having a coefficient of thermal expansion less than the outer tubular member so that the constricted passage expands upon the addition of heat, but contracts during the cooling cycle to promote sealing integrity.

DESCRIPTION OF THE PREFERRED EMBODIMENT

Figure 1:
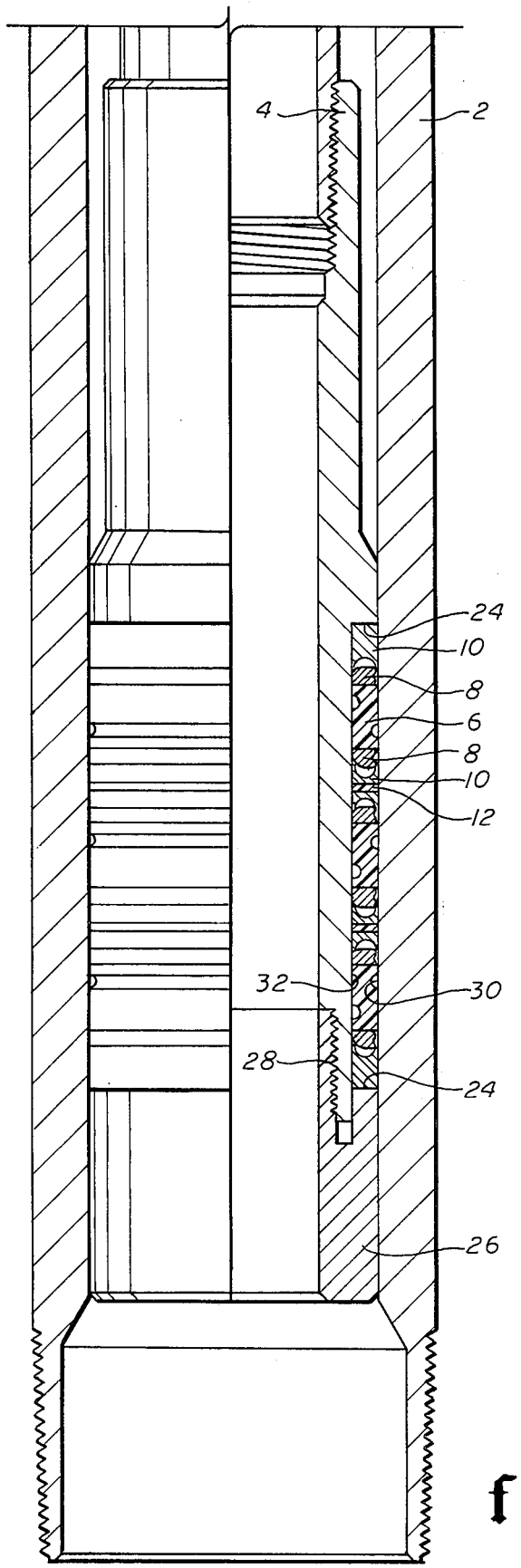
FIG. 1 is a view of an expansion joint used in oil and gas well tubing showing the seal assembly between inner and outer conduits.

As shown in FIG. 1, the seal system comprising the preferred embodiment of this invention can be positioned between an outer tubular member 2 and an inner tubular member 4 to establish sealing integrity in the radial gap between the inner and outer tubular members. FIG. 1 illustrates the use of the seal system comprising the preferred embodiment of this invention in conjunction with an expansion joint used to compensate for relative movement of separate elements in a tubing string employed in oil or gas wells. Inner member 4 is free to move longitudinally relative to outer tubular member 2, but it is necessary to maintain sealing integrity between the two concentric tubular members under static or dynamic conditions. The sealing system shown in FIG. 1 consists of a stack of separate seal assemblies, each comprising a plurality of separate members. The first or principal sealing element comprises a cylindrical member 6. In the preferred embodiment of this invention this cylindrical member comprises a thermpolastic member which will not flow or melt under the high temperatures at which adequate sealing integrity is necessary. A desirable thermoplastic material for use in sealing at least up to 625° F. comprises a thermoplastic polytetrafluoroethylene, commonly referred to under the DuPont trademark "Teflon". In the preferred embodiment of this invention a suitable filler has been employed in conjunction with the thermoplastic element. A glass-fiber filler comprising fifteen (15%) percent by weight of the Teflon material will improve the compressive strain of the virgin Teflon resin by approximately twenty-five (25%) percent.

In addition to the primary thermoplastic sealing element 6, the preferred embodiment of this invention also employs a second cylindrical member or seal ring 8 positioned adjacent to one edge of Teflon element 6. This intermediate or secondary cylindrical spacer member 8 is positioned between the first cylindrical thermoplastic element 6 and a third cylindrical or back-up member 10. Note that identical seal rings and back-up rings would generally be employed on opposite axial sides of a central thermoplastic element 6. A separate low pressure seal 12 can be employed in conjunction with the seal system comprising the first, second and third cylindrical members. As will be subsequently apparent, the sealing action of thermoplastic member 6 during heating and cooling cycles does not necessarily provide for an initial low pressure seal prior to any thermal cycling. For that reason, this separate low pressure seal 12 can be employed for sealingly engaging appropriate surfaces on concentric tubular members 2 and 4. This low pressure seal can consist of a thermoplastic or Teflon member which is dimensioned to establish contact with opposed sealing surfaces at ambient or room temperature. As seen quite clearly in FIG. 1, individual seal subassemblies comprising thermoplastic elements 6, seal ring 8, and back-up ring 10 can be employed in a stacked configuration as well as independently.

Figure 2:
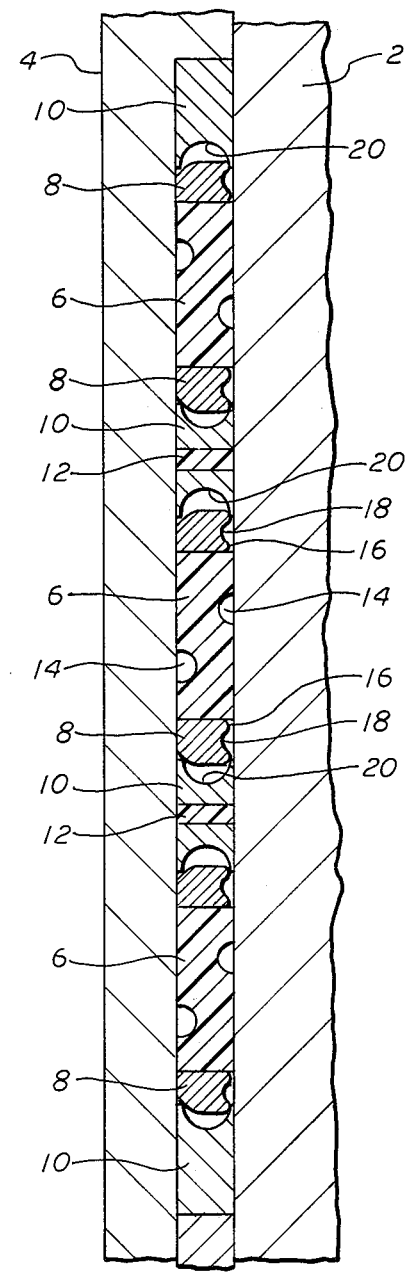
FIG. 2 is an enlarged scale view of the seal assembly of FIG. 1.
Figure 3:
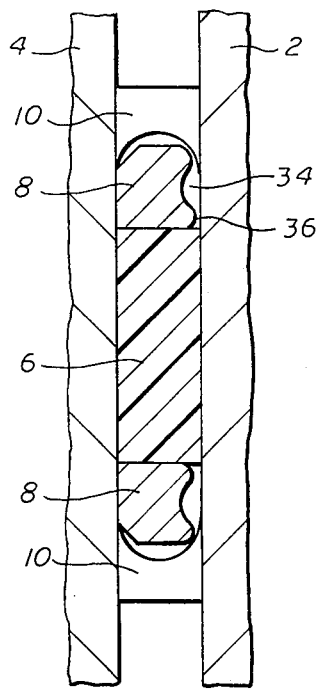
FIG. 3 is a longitudinal section view showing a single seal system in its initial configuration.
Figure 4:
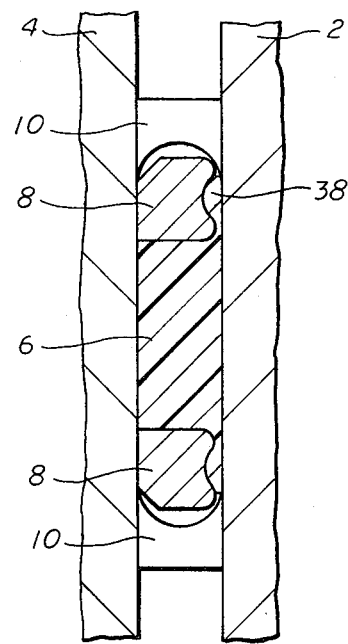
FIG. 4 is a similar longitudinal section view showing the expansion of the primary sealing element upon heating.

Thermoplastic element 6 comprises a generally cylindrical element having optional relief grooves 14 located along its opposite radial surfaces. Note that in the preferred embodiment of this invention the axial dimension of Teflon member 6 is significantly greater than its radial dimension. Seal ring 8, positioned adjacent sealing element 6, has an annular ring or raised surface 16 located adjacent the axial surface abutting sealing element 6. This raised annular up 6 is contoured to smoothly merge with an outwardly facing concave surface 18. Back-ring ring 10 also has a concave surface 20. Concave surface 20 is, however, facing in the axial direction and forms an inclined surface immediately adjacent seal ring 8 and the cavity formed by radially facing concave surface 18. Both the seal ring concave surface and the seal ring annular raised surface are radially recessed relative to the outer edge of back-up ring 10 since the thickness of seal ring 8 is less than the raidal gap between interior and exterior condiuts. When the seal stack or individual seal subassembly, as shown in FIG. 2, is positioned between inner and outer conduits the outer surface of back-up member 10 is closer to the inner surface of the exterior tubular member then are the concave surface 18 and annular ring 16 on intermediate seal ring 8. A cavity 34, shown in FIG. 3, is thus formed between the seal ring 8 and the inner surface 30 of outer tubular member 2. Annular ring 16 is also spaced from surface 30 forming a constricted axial passage 36 therebetween. As shown in FIG. 1, the entire seal subassembly or seal stack may be positioned around the inner tubular member 4 between a retaining shoulder 24 and a seal retainer 26 engaging inner tubular member 4 by means of threaded connection 28. Although the seal assembly is mounted on inner tubular member 4 in the present embodiment, the seal assembly could, in turn, be mounted upon the outer tubular body 2. When mounted on inner tubular body 4 the inner seal bore surface 32 on inner member 4 contacts the seal assembly which provides a static seal with that member. Seal bore surface 30 on the outer tubular member, however, is free to move relative to the seal assembly. A dynamic seal is thus provided relative to this longitudinally or axially movable surface.

The seal assembly comprising the preferred embodiment of this invention is expecially adapted for establishing sealing, integrity during both heating and cooling cycles. Normally, axially extrusion of a Teflon or other thermoplastic element during the heating cycle will lead to an inability of the sealing member to maintain sealing integrity as the material cools. Contraction of the axially extruded sealing member results in the movement of the sealing member radially away from the surface with which sealing integrity must be maintained. As shown in FIGS. 3 through 6, the seal assembly comprising the preferred embodiment of this invention utilizes the tendency of the primary sealing material, such as Teflon, to axially extrude as a means of maintaining sealing integrity over a significant portion of the cooling cycle. FIG. 3 illustrates the sealing assembly prior to the addition of heat. The thermoplastic sealing element 6 is depicted as having a rectangular cross section. Note that pressure acting along axially facing surfaces is transmitted through the back-up ring and the seal ring to the thermoplastic member. If the thermoplastic member is not in contact with the inner and outer tubular members initially, such contact will be established early in the initial heating cycle. At that point, the seal will hold under the action of pressure forces depicted in FIG. 3. As the thermoplastic element 6 is heated under pressure the sealing material will axially extrude through the constricted passage between annular raised surface 16 and the surface 30 of outer tubular member 2. Continued heating will ultimately cause the sealing material to fill the cavity 34 between concave surface 18 and surface 30. The extruded material 38 filling this cavity will be prevented from axially extruding past back-up member 10. As the material acts against the inclined or concave surface 20 back-up member 10 will be urged radially outward into engagement with the inner surface 30 of outer tubular member 2 to prevent extrusion of the sealing material axially therepast. It is quite evident that a satisfactory seal will be provided along both surfaces 30 and 32 of the outer and inner tubular members, respectively, when the seal assembly has been energized by the application of heat.

Figure 5:
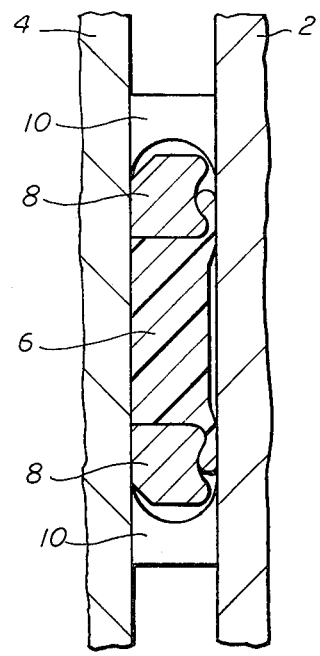
FIG. 5 is another longitudinal section view illustrating the contraction of the primary sealing material upon cooling.

FIG. 5 demonstrates the action of this seal assembly during the cooling cycle. As thermoplastic element 6 contracts during the cooling cycle, the outer surface recedes radially away from seal bore surface 30 in the central portion of sealing element 6. In addition to this radial contraction, sealing element 6 will also longitudinally retract. Longitudinal contraction of extruded material 38 must, however, occur through constriction 36 between cavity 34 and the primary sealing element 6. This longitudinal contraction through the constricted passage acts to maintain a seal with seal bore surface 30 over a greater range of temperature during the cooling cycle than could otherwise be maintained by sealing element 6.

Although the configuration consisting of constriction 36 and cavity 34 can be employed adjacent both the inner and outer tubular members, the preferred embodiment of this invention employs this configuration only adjacent the outer tubular member. It has been found that the leak path between a sealing element and inner and outer tubular member occurs along the outer surface rather, than along the inner surface. As the sealing element cools the circumference of the interior surface of this circumferential or annular member will tend to contract maintaining sealing integrity with surface 32 on the inner member. It is only the outer surface of the sealing element which will tend to draw away from its cooperating seal bore surface.

In addition to employing the configuration shown in FIGS. 1 through 5 to promote sealing integrity along the seal bore surface of the outer tubular member, the performance of this seal system can be significantly augmented by the appropriate selection of relative coefficient of thermal expansion for the separate components. In the expansion joint with which this seal is used in its preferred embodiment, the inner and outer tubular members will be formed from a carbon steel. By choosing a thermoplastic material, such as Teflon, having a coefficient of thermal expansion significantly greater than that of the tubular members, sealing integrity will, of course, be promoted during the heating cycle and the action of this configuration during the cooling cycle can be obtained. If a seal ring element 8 is formed of a material such as cast iron, having a coefficient of thermal expansion less than the coefficient of thermal expansion of the carbon steel utilized for the inner and outer tubular members, constriction 36 will grow during the heating cycle and tend to decrease during the cooling cycle. As this constriction tends to decrease during the cooling cycle the axial contraction of extruded sealant 38 will enhance the sealing integrity formed in the neighborhood of constriction 36. Finally, back-up member 10 can be formed of a material having a coefficient of thermal expansion slightly in excess of the coefficient of thermal expansion of the carbon steel tubular members. Back-up member 10 will then act to maintain the tight anti-extrusion barrier needed to prevent unrestricted axial extrusion of the Teflon material.

Figure 6:
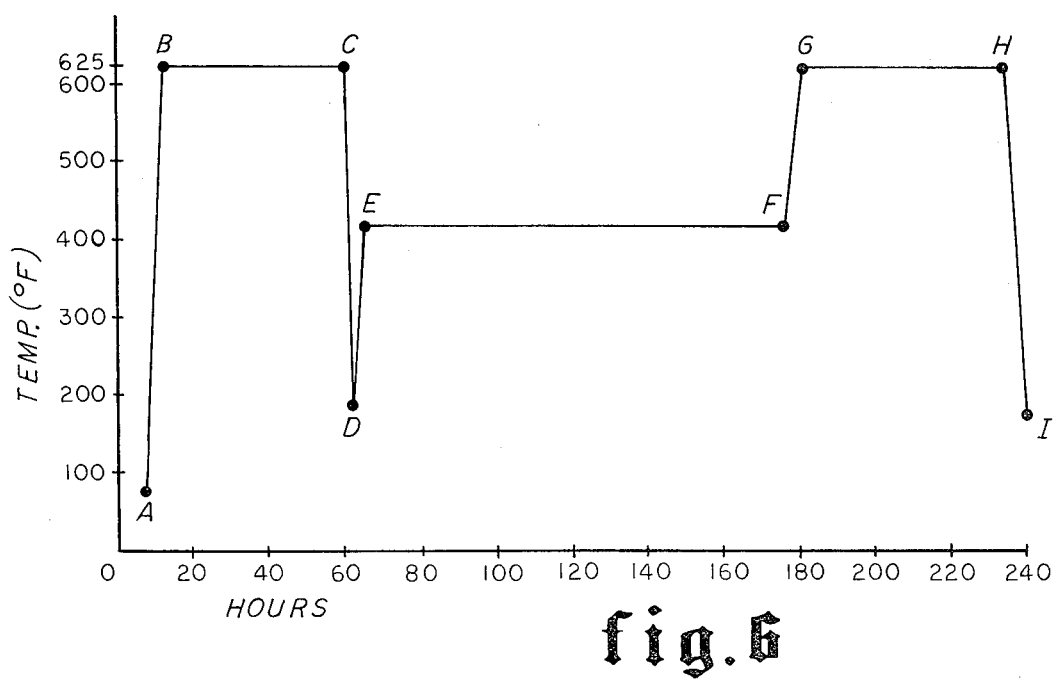
FIG. 6 illustrates the performance of the seal member in graphical fashion.

The performance of this sealing configuration is depicted in graphical form by FIG. 6. This Figure depicts the heating and cooling cycles which this seal assembly may be subjected to while still maintaining adequate sealing performance. This test begins at Point A with the seal system at ambient conditions. The seal system was heated from Point A to B, at which the seal assembly withstood a temperature of 625° F. and a pressure ranging from 1800 to 1900 psi for 48 hours. At Point C, after 48 hours under these conditions the seal assembly was cycled by moving the outer tubular member longitudinally relative to the inner tubular member for three cycles to demonstrate that an adequate dynamic seal had been maintained. The segment from C to D represents a cooling cycle during which the pressure was maintained at 500 psi. The temperature fell to 180° at Point D, at which point adequate sealing integrity was maintained. The seal assembly was then again heated to a temperature of 425° F., corresponding to Point E. Thid temperature of 425° F. and a pressure of 300 psi were maintained for a period of 110 hours, after which satisfactory dynamic performance was again demonstrated by longitudinal relative movement of the tubular members for three cycles. The heating cycle between Points F and G brought the temperature of the seal assembly again to 625° F. at Point G. From Point G to Point H the temperature was maintained at 625° F. and the pressure was maintained at 1800 to 1900 psi. At Point H the assembly was again cycled three times with sealing integrity being maintained. The cooling cycle between Point H and Point I brought the temperature of the seal assembly to 180° F. at Point I. No leak occurred at this temperature and below 180° F. sealing integrity was still maintained for pressures below 500 psi. For reference convenience, the term "cylindrical" has been utilized in the specification and claims to define the various sealing elements. It is intended that this term be deemed to be the equivalent of "annular" which, as a practical matter, represents the actual configuration of the sealing element as depicted in the drawings.

Although the invention has been described in terms of the specified embodiment which is set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A seal system for establishing sealing integrity between an inner tubular member and a concentric outer tubular member, comprising:
  a cylindrical sealing element encircling said tubular member;
  cylindrical back-up means, axially spaced from said sealing element, for preventing axial extrusion of said sealing element therepast; and
  an intermediate member between said sealing element and said back-up means, at least one peripheral surface of said intermediate member being recessed from the cooperating surface of the adjacent tubular member to form a cavity therebetween and a radially raised surface on said intermediate member between said cavity and said sealing element forming a constructed passage through which said sealing element axially extrudes into said cavity with sealing integrity being maintained with said adjacent tubular member immediate said radially rasied surface during contraction of said sealing element.

2. A seal system for establishing sealing integrity between an inner tubular member and an outer tubular member, comprising:
a cylindrical sealing element encircling said inner tubular member;
first and second axially spaced, cylindrical, back-up members encircling said inner tubular members on opposite sides of said cylindrical sealing element, the peripheral surfaces of said first and second back-up members being contiguous with cooperable peripheral surfaces of said inner and outer tubular members to prevent axial extrusion of said sealing element therepast; and
at least one cylindrical intermediate member between said sealing element and one of said back-up members, the outer peripheral surface of said intermediate member being radially recessed from the outer peripheral surface of said one back-up member and having a radially raised surface spaced from said one back-up member extending radially beyond the outer peripheral surface of said intermediate member adjacent said one back-up member, said radially raised surface being recessed from the outer peripheral surface of said one back-up member to permit axial extrusion of said sealing element therepast with residual sealing integrity with said outer tubular member being maintained along said radially raised surface during contraction of said sealing element.

3. The seal system of claim 2 wherein said sealing element comprises a thermoplastic element.

4. The seal system of claim 3 wherein said sealing element comprises a polytetrafluoroethylene element.

5. The seal system of claim 2 wherein the inner peripheral surface of said intermediate member is adjacent to and concentric with the outer surface of the inner conduit.

6. A seal system for establishing sealing integrity between an inner tubular member and an outer tubular member, comprising:
a cylindrical sealing element encircling said inner tubular member and having a coefficient of thermal expansion greater than the coefficient of thermal expansion of said inner and outer tubular members;
first and second axially spaced, cylindrical, back-up members encircling said inner tubular member on opposite sides of said cylindrical sealing element, said back-up members having a coefficient of thermal expansion greater than the thermal coefficient of expansion of said inner and outer tubular members and less than the coefficient of thermal expansion of said cylindrical sealing element, the peripheral surfaces of said first and second back-up members being contiguous with cooperable peripheral surfaces of said inner and outer tubular members to prevent axial extrusion of said sealing element therepast; and
at least one cylindrical intermediate member between said sealing element and one of said back-up members, said intermediate member having a coefficient of thermal expansion less than the coefficient of thermal expansion of said outer tubular member so that the radial separation of said intermediate member and said outer tubular member increases with increasing temperature with said sealing element expanding between said intermediate member and said outer tubular member upon heating and with residual sealing integrity with said outer conduit being maintained upon cooling between said intermediate member and said outer tubular member.

7. The seal system of claim 6 wherein said sealing element comprises a thermoplastic element.

8. The seal system of claim 7 wherein said sealing element comprises a polytetrafluoroethylene element.

9. The seal system of claim 6 wherein said intermediate member comprises a cast iron member.

10. The seal system of claim 6 wherein the outer peripheral surface of said intermediate member is radially recessed from the outer peripheral surface of said one back-up member and has a radially raised surface spaced from said back-up member extending radially beyond the outer peripheral surface of said intermediate member adjacent said one back-up member, said radially raised surface being radially recessed from the outer peripheral surface of said back-up member to permit axial extrusion of said sealing element therepast with residual sealing integrity with said outer conduit being maintained along said radially raised surface.

11. Apparatus for maintaining sealing integrity between concentric inner and outer tubular members having a radial gap therebetween during and after the application of heat to the tubular members, comprising:
cylindrical sealing means circumferentially encompassing the inner tubular member, said cylindrical sealing element being radially expandable upon the application of heat for establishing sealing integrity with cooperating surfaces on said inner and outer tubular members, said cylindrical sealing means contacting to maintain sealing integrity with said inner tubular member upon cooling; and
a cylindrical intermediate spacer member adjacent said cylindrical sealing means between said inner and outer tubular members, the radial thickness of said spacer member being less than the gap between said inner and outer tubular member to form a cavity between said spacer member and said outer tubular member, said spacer member having a raised annular surface adjacent said cylindrical sealing means to form a constricted passage between said cavity and said cylindrical sealing means through which said cylindrical sealing means axially expands when heated, said cylindrical sealing means maintaining sealing integrity with said outer tubular member at said constricted passage upon cooling.

12. Apparatus for establishing a seal between concentric inner and outer tubular members having a radial gap therebetween, comprising:
a first cylindrical element extending circumferentially between said inner and outer tubular members and having a coefficient of thermal expansion greater than the coefficient of thermal expansion of said inner and outer tubular members; and
a second cylindrical element extending circumferentially between said inner and outer tubular members laterally adjacent said first cylindrical element and having a coefficient of thermal expansion less than the coefficients of thermal expansion of said first and second tubular members and said first cylindrical member; the radial thickness of said second cylindrical element being less than said radial gap to form an axially extending cavity between said second cylindrical element and said outer tubular member, the volume of said cavity increasing in the presence of the relatively greater thermal expansion of said outer tubular member than the thermal expansion of said second cylindrical member with said first cylindrical member expanding into said cavity upon thermal expansion with a portion of said first cylindrical element remaining in said cavity upon cooling to maintain a residual seal between said inner and outer tubular members.

13. The apparatus of claim 12 wherein said second cylindrical element comprises an annular ring adjacent said first cylindrical element to form a constriction between said first cylindrical element and the remaining portion of said cavity, said first cylindrical element expanding through said constriction.

14. The apparatus of claim 12 further comprising a third cylindrical element extending circumferentially between said inner and outer tubular members laterally adjacent said second cylindrical element and having a coefficient of thermal expansion greater than the coefficient of thermal expansion of said inner and outer tubular members to prevent expansion of said first cylindrical element axially therepast.

15. The apparatus of claim 14 wherein said third cylindrical element includes inclined surfaces adjacent said second cylindrical member, with axial forces exerted on said inclined surfaces forcing said inclined surfaces radially toward said inner and outer tubular members.

16. The apparatus of claim 12 further comprising a third cylindrical element extending circumferentially between said inner and outer tubular members laterally adjacent said second cylindrical element and having an inclined surface adjacent said outer tubular member, axial forces acting on said inclined surfaces forcing said third cylindrical element outwardly toward said outer tubular member.

17. The apparatus of claims 12, 13, 14, 15, and 16, wherein said first cylindrical element comprises a thermoplastic material.

18. The apparatus of claim 17 wherein said thermoplastic material comprises polytetrafluoroethylene.

19. Apparatus for establishing sealing integrity along a surface, comprising:
a sealing element;
a cavity immediate said surface and laterally of said sealing element; and
constricted passage means between said cavity and said sealing element for allowing expansion of said sealing element therethrough into said cavity upon thermal expansion and partial withdrawal therethrough upon cooling with said sealing element maintaining sealing integrity with said surface in the vicinity of said constricted passage means upon cooling.

20. The apparatus of claim 19 wherin said cavity is defined between said surface and a second member adjacent said sealing element.

21. The apparatus of claim 20 wherein the thermal coefficient of expansion of said secondary member relative to said surface is chosen so that the volume of said cavity expands upon the application of heat.

22. The apparatus of claim 20 wherein said secondary member comprises a raised surface to form said constricted passage means.

23. The apparatus of claim 20 wherein the thermal coefficient of expansion of said sealing element is greater than the thermal coefficient of expansion of said secondary member.

24. The apparatus of claim 20 comprising a third member adjacent said second member is positioned in engagement with said surface to prevent said sealing element from expanding therepast.

25. The apparatus of claims 19, 20, 21, 22, 23, and 24, wherein said sealing element comprises a thermoplastic material.

26. The apparatus of claim 25 wherein said thermoplastic material comprises polytetrafluoroethylene.

27. Apparatus for maintaining sealing integrity formed by a thermally expanded sealing material along a surface as said surface and said sealing material are cooled, comprising means adjacent said sealing material defining a cavity extending axially of said sealing material and along said surface into which said sealing material expands during the addition of heat and a constricted passage adjacent said surface and laterally of said cavity through which said sealing material partially retracts during cooling with sealing integrity being maintained at said constricted passage.

28. Apparatus for maintaining sealing integrity formed by a thermally expanded sealing thermoplastic element along a surface as said surface and said thermoplastic element are cooled, comprising means adjacent said sealing material defining a cavity extending axially of said thermoplastic element and along said surface into which said thermoplastic element expands during the addition of heat and a constricted passage adjacent said surface and laterally of said cavity and said thermoplastic element through which said thermoplastic element partially retracts during cooling with sealing integrity being maintained at said constricted passage.

29. Apparatus for maintaining sealing integrity formed by a thermally expandable sealing material along a surface from which the sealing material withdraws upon cooling, comprising means adjacent said sealing material defining a cavity extending axially of said sealing material and along said surface into which said sealing material expands during the addition of heat and a constricted passage adjacent said surface and laterally of said cavity through which said sealing material partially retracts during cooling with sealing integrity being maintained at said constricted passage.

30. An expansion joint for use in a tubular conduit string in an oil or gas subterranean well for compensating for the contraction and expansion of the tubular conduit string, comprising inner and outer relatively axially movable tubular members attached to oppositely extending portions of said tubular conduit string; and a sealing assembly further comprising a sealing element encircling said inner tubular member; a cylindrical back-up means axially spaced from said sealing element for preventing axial extrusion of said sealing element therepast; and an intermediate member between said sealing element and said back-up means, at least one peripheral surface of said intermediate member being recessed from the cooperating surface of the adjacent tubular member to form a cavity therebetween and a radially raised surface between said cavity and said sealing element forming a constricted passage through which said sealing element axially extrudes into said cavity with sealing integrity being maintained with said adjacent tubular member along said radially raised surface.

31. A method of establishing and maintaining sealing integrity between two adjacent axially extending members comprising the steps of permitting a sealing element disposed between the two adjacent members to axially extrude through a radially constricted passageway into a cavity during thermal expansion of the sealing element and to further constrict axial flow of said sealing element during thermal contraction with sealing integrity being maintained immediate said constricted passage.

32. A method of establishing and maintaining sealing integrity between concentric inner and outer tubular members comprising the steps of: allowing axial extrusion of a sealing element when heated, the sealing element being disposed between and contacting both said inner and outer tubular members, axial extrusion occurring between said outer tubular member and an immediate cylindrical member adjacent said sealing element, the radial separation between said intermediate cylindrical member increasing upon the addition of heat; preventing further axial extrusion of the sealing element past a cylindrical back-up member adjacent to said intermediate cylindrical member; and restricting the axial contraction of said sealing element during cooling to maintain sealing intergrity along said outer tubular member immediate said intermediate cylindrical member.

* * * * *